(12) United States Patent
Tukachinsky et al.

(10) Patent No.: US 6,652,943 B2
(45) Date of Patent: Nov. 25, 2003

(54) MULTILAYER POLYMERIC ARTICLE WITH INTERCROSSLINKED POLYMER LAYERS AND METHOD OF MAKING SAME

(75) Inventors: Alexander Tukachinsky, Caldwell, NJ (US); Michael L. Friedman, Wayne, NJ (US); Paul W. Ortiz, Wayne, NJ (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 0 days.

(21) Appl. No.: 09/873,612

(22) Filed: Jun. 4, 2001

(65) Prior Publication Data

US 2002/0197482 A1 Dec. 26, 2002

(51) Int. Cl.[7] .................. B32B 1/08; B32B 25/08; B32B 25/14; B32B 27/30
(52) U.S. Cl. .............. 428/36.91; 428/420; 428/421; 428/422; 428/521; 428/906
(58) Field of Search .................. 428/36.91, 420, 428/421, 422, 521, 523, 906

(56) References Cited

U.S. PATENT DOCUMENTS

| | | | | |
|---|---|---|---|---|
| 3,269,862 A | * | 8/1966 | Lanza et al. | 174/120 SR |
| 3,650,827 A | | 3/1972 | Brown et al. | 428/383 |
| 4,041,207 A | | 8/1977 | Takada et al. | 428/421 |
| 4,155,823 A | | 5/1979 | Gotcher et al. | 522/81 |
| 4,677,017 A | | 6/1987 | DeAntonis et al. | 428/214 |
| 4,840,849 A | | 6/1989 | Harada et al. | 428/419 |
| 5,093,166 A | * | 3/1992 | Nishimura | 138/126 |
| 5,480,721 A | | 1/1996 | Pozzoli et al. | 428/422 |
| 5,578,681 A | | 11/1996 | Tabb | 525/194 |
| 5,916,659 A | | 6/1999 | Koerber et al. | 428/86 |
| 6,207,277 B1 | * | 3/2001 | Shieh | 428/375 |

FOREIGN PATENT DOCUMENTS

| | | |
|---|---|---|
| EP | 1038904 A1 | 9/2000 |
| WO | WO 98/05493 | 2/1998 |
| WO | 01/69610 A1 | 9/2001 |
| WO | 02/16111 A1 | 2/2002 |

OTHER PUBLICATIONS

Encyclopedai of Polymer Science and Engineering, Supplement Volume, Coating: Radiation–cure Coatings, pp 109–110, Jan. 1998.*

* cited by examiner

Primary Examiner—Ramsey Azcharia
(74) Attorney, Agent, or Firm—Jeffrey C. Lew

(57) ABSTRACT

An intercrosslinked multilayer polymeric article comprises (A) at least one thermoplastic polymer layer in contact with (B) at least one crosslinkable polymer layer, wherein (A) and (B) are incompatible with each other, and wherein (A) and (B) are secured together by intercrosslinking. Also disclosed is a method for preparing an intercrosslinked polymeric article.

17 Claims, No Drawings

MULTILAYER POLYMERIC ARTICLE WITH INTERCROSSLINKED POLYMER LAYERS AND METHOD OF MAKING SAME

FIELD OF THE INVENTION

The present invention relates to polymeric multilayer articles such as films, sheets, pipes, tubing, hollow bodies, and the like that utilize a thermoplastic polymer as one of the layers in the multilayer article.

BACKGROUND OF THE INVENTION

High performance thermoplastics, for example, thermoplastic fluoropolymers have a unique combination of properties, such as high thermal stability, chemical inertness and non-stick release properties. Therefore, they are used in a great variety of fields related to high-temperature, aggressive chemicals and release applications. However, these polymers are expensive in comparison to many other polymers. Multilayer structures provide a suitable means of reducing the cost of articles fabricated of fluoropolymers in which they are combined with other polymers which, furthermore, contribute their own properties and advantages such as, for example, low density, elasticity, sealability, scratch resistance and the like. When producing multilayer structures containing fluoropolymers there is always a problem of achieving appropriate interlayer adhesion to the fluoropolymer layer. Many fluoropolymers are non-polar and have very low surface energy (non-wetting surface). Interlayer wetting can be achieved by melting the fluoropolymer; however, upon solidifying, layers of the resulting multilayer product can be easily separated (delaminated). In most cases, interlayer adhesion is insufficient unless the fluoropolymer is chemically functionalized or its surface is chemically modified by special treatment techniques, which are both costly and complex. If the objective is to produce a multilayer article with a very thin fluoropolymer layer, modification of the interlayer surface can become a very costly or even impossible operation. Chemically functionalized fluoropolymers are expensive, and they are designed for adhesion to particular polymers such as nylons, and not to polyolefins. Functionalized forms of materials based on many thermoplastic fluoropolymers, such as a perfluorinated copolymer of ethylene and propylene (FEP), a copolymer of tetrafluoroethylene and perfluoromethylvinylether (MFA) or a perfluoroalkoxy resin (PFA) are not commercially available at all.

U.S. Pat. No. 3,650,827 (Brown et al., Mar. 21, 1972) describes a cable having a central copper conductor coated with a polyethylene composition. The control cable is subjected to an irradiation dose of about 10 megarads. A thin layer of a copolymer of tetrafluoroethylene and hexafluoropropylene (FEP) is extruded over the coated cable. Following extrusion, high-energy electron, X-rays or ultraviolet light is used to induce crosslinking in the FEP sheath at a temperature above the glass transition temperature of the FEP.

U.S. Pat. No. 4,155,823 (Gotcher et al. May 22, 1979) relates to melt processable fluorocarbon polymer compositions that require a processing temperature above 200° C. and are rendered radiation cross-linkable by incorporating crosslinking agents into the fluorocarbon polymer. The fluorocarbon polymer is exposed to a dose of radiation sufficient to provide a satisfactory degree of crosslinking without degrading the fluorocarbon polymer.

U.S. Pat. No. 4,677,017 (DeAntonis, Jun. 30, 1987) is directed to a multilayered film and a process to coextrude a multilayered film. The coextruded film has at least one thermoplastic fluoropolymer layer and at least one thermoplastic polymer layer adjacent thereto. An adhesive of a modified polyolefin resides between each thermoplastic fluoropolymer layer and each thermoplastic polymeric layer.

U.S. Pat. No. 5,480,721 (Pozzoli et al., Jan. 2, 1996) relates to the adhesion of fluorinated polymers to non-fluorinated thermoplastic materials by the use of an adhesive middle layer that comprises a blend comprising a fluorinated and a non-fluorinated thermoplastic and an ionomer or blends of more ionomers comprising copolymers having reactive groups which can be salified or not.

U.S. Pat. No. 5,578,681 (Tabb, Nov. 26, 1996) provides curable elastomeric blends of fluoroelastomer and ethylene copolymer elastomer in which at least one of the fluoroelastomer and ethylene copolymer elastomer contain a cure site monomer.

U.S. Pat. No. 5,916,659 (Koerber et al., Jun. 29, 1999) relates to stratified composites containing polymers which do not readily adhere to each other under the influence of heat and pressure. In particular, this reference relates to composites consisting of discrete layers of fluoropolymeric and non-fluoropolymeric materials, which possess improved peel adhesive properties through the novel use of a fibrous binder.

WO 98/05493 (Spohn, E. I. DuPont de Nemour and Company, International Publication Date of Feb. 12, 1998) provides a laminate comprising fluoropolymer and polyamide layers, which laminate can be formed in a single extrusion step, i.e., by coextrusion, wherein the fluoropolymer layer and the polyamide layer adhere to one another without the presence of an adhesive tie layer.

SUMMARY OF THE INVENTION

Disclosed is an intercrosslinked multilayer polymeric article, comprising;
(A) at least one thermoplastic polymer layer in contact with
(B) at least one crosslinkable polymer layer, wherein (A) and (B) are incompatible with each other, and wherein (A) and (B) are secured together by intercrosslinking.

Another embodiment of this invention is directed to a method for preparing an intercrosslinked multilayer polymeric article, comprising;
(A) at least one thermoplastic polymer layer in contact with
(B) at least one crosslinkable thermoplastic polymer layer, wherein (A) and (B) are incompatible with each other, the process comprising the steps of;
placing (A) and (B) in direct contact with each other at a temperature above the melting point of both (A) and (B) and at a pressure of from 0.1 to 80 MPa to form a multilayer article; and
crosslinking the multilayer article while maintaining contact between (A) and (B) to form the intercrosslinked multilayer polymeric article.

DETAILED DESCRIPTION OF THE INVENTION

The intercrosslinked multilayer polymeric article comprises the placing of at least one thermoplastic polymer layer (A) in contract with at least one crosslinkable polymer layer (B). It is important to note that the (A) and (B) polymeric layers are incompatible with each other. The placing of (A) in direct contact with (B) is conducted at a temperature above the melting point of both (A) and (B) and at a pressure of from 0.1 to 80 MPa to form a multilayer article. By crosslinking the multilayer article, a bond is formed between (A) and (B) such that an intercrosslinked multilayer polymeric article is formed.

(A) The Thermoplastic Polymer Layer

The thermoplastic polymer layer is prepared from a thermoplastic resin comprising polyolefins, polyamides, polyesters, or fluoropolymer resins. Preferred are the fluoropolymer resins. Typically, thermoplastic resins do not chemically react upon the application of heat, but they melt and flow and can be extruded in the form of films or sheets. Thermoplastic fluoropolymers having utility as Component (A) comprise fluorinated copolymer of ethylene and propylene (FEP), fluorinated copolymer of tetrafluoroethylene and perfluoropropylvinyl ether (PFA), copolymer of ethylene and tetrafluoroethylene (ETFE), copolymer of ethylene and chlorotrifluoroethylene (ECTFE), polychlorotrifluoroethylene polymer (PCTFE), polyvinylidine fluoropolymer (PVDF), terpolymer containing segments of tetrafluoroethylene, hexafluoropropylene and vinylidene fluoride (THV), blends and alloys thereof, or blends or alloys thereof. A preferred fluoropolymer is FEP. The THV resin is available from Dyneon 3M Corporation Minneapolis, Minn. The ECTFE polymer is available from Ausimont Corporation (Italy) under the trade name Halar. Other fluoropolymers used herein may be obtained from Daikin (Japan), DuPont (USA) and Hoechst (Germany).

Further, (A) may be a crosslinkable polymer itself. Crosslinkable polymers that can function as (A) include polyamides, polyesters and their copolymers, and polyolefins including polyethylene. Of the above thermoplastic fluoropolymers, it is to be noted that ETFE, THV and PVDF can be crosslinked by radiation such as e-beam.

(B) The Crosslinkable Thermoplastic Polymer Layer

Having utility as the crosslinkable thermoplastic polymer layer (B) for this invention are polyolefins, either as homopolymers, copolymers, terpolymers, or mixtures thereof. Types of polyolefins for the instant invention are high-density polyethylene (PE), medium-density PE, low-density PE, ultra low-density PE, ethylenepropylene copolymers, ethylene-butene-1 copolymer, polypropylene (PP), polybutene-1, polypentene-1, poly-4-methylpentene-1, polystyrene, ethylene-propylene rubber (EPR), ethylene-propylene-diene polymer (EPDM), etc. A preferred type of polyolefin for this invention is EPDM.

The EPDM polymers used comprise interpolymerized units of ethylene, propylene and diene monomers. Ethylene constitutes from about 63 wt. % to about 95 wt. % of the polymer, propylene from about 5 wt. % to about 37 wt. %, and the diene from about 0.2 wt. % to about 15 wt. %, all based upon the total weight of EPDM polymer. Preferably, the ethylene content is from about 70 wt. % to about 90 wt. %, propylene from about 17 wt. % to about 31 wt. %, and the diene from about 2 wt. % to about 10 wt. % of the EPDM polymer. Suitable diene monomers include conjugated dienes such as butadiene, isoprene, chloroprene, and the like; non-conjugated dienes containing from 5 to about 25 carbon atoms such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclononadienes such as 3-methylbicyclo-(4,2,1)-nona-3,7-diene, and the like, indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclodienes such as 3-methyltricyclo (5,2,1,0.sup.2,6)-deca-3,8-diene and the like. More preferred dienes include the non-conjugated dienes. The EPDM polymers can be prepared readily following known suspension and solution techniques, such as those described in U.S. Pat. No. 3,646,169 and in Friedlander, Encyclopedia of Polymer Science and Technology, Vol. 6, pp. 338–386 (New York, 1967). The EPDM polymers are high molecular weight, solid elastomers. They typically have a Mooney viscosity of at least about 20, preferably from about 25 to about 150 (ML 1+8at 125° C.) and a dilute solution viscosity (DSV) of at least about 1, preferably from about 1.3 to about 3 measured at 25° C. as a solution of 0.1 gram of EPDM polymer per deciliter of toluene. The raw polymers may have typical green tensile strengths from about 800 psi to about 1,800 psi, more typically from about 900 psi to about 1,600 psi, and an elongation at break of at least about 600 percent. The EPDM polymers are generally made utilizing small amounts of diene monomers such as dicyclopentadiene, ethylnorborene, methylnorborene, a non-conjugated hexadiene, and the like, and typically have a number average molecular weight of from about 50,000 to about 100,000.

Components (A) and (B) are incompatible with each other and the two components are placed in direct contact with each other at a temperature above the melting point of both (A) and (13), preferably not above 400° C. and at a pressure of from 0.1 to 80 MPa, preferably not above 40 MPa to pre-form the multilayer article. By "incompatible," it is meant that (A) and (B) do not mix or dissolve into each other even when placed in contact with each other at above the melting point of each. No chemical interaction occurs between (A) and (B), and there is virtually no bonding between these components. One layer each of (A) and (B) is present. In other embodiments, there are present two layers of (A) in contact with each side of one layer of (B) or two layers of (B) in contact with each side of one layer of (A). A further embodiment involves a plurality of layers of (A) placed next to a plurality of layers of (B) wherein the (A) and (B) layers alternate singly with each other, wherein when an odd number of (A) and (B) layers are present, the terminal layers are either both (A) or both (B) and when an even number of (A) and (B) layers are present, one outside layer is (A) and the other outside layer (B). Additionally, layers other than (A) and (B) may be present, provided that there are at least one pair of (A) and (B) layers contacting each other.

There are various methods for contacting (A) and (B). These methods are co-extrusion, co-lamination, extrusion-lamination, melt coating of a preformed layer and co-molding. With respect to co-molding, the co-molding can be by co-injection molding, multi-material molding, multi-shot molding, transfer molding, blow molding, and compression molding including multilayer compression molding. By the method of co-molding, a multilayer article such as a container is provided. By the method of co-extrusion, a film or sheet or a tubing or a profile is provided.

The molding is generally accomplished via three fundamental molding techniques: compression molding, transfer molding, and co-injection molding. A description of these molding techniques can be found in Wright, Ralph E., *Molded Thermosets; A Handbook for Plastics Engineers, Molders, and Designers*, Hanser Publishers, Oxford University Press, New York, 1991.

The choice of molding technique is largely determined by the design and functional requirements of the molded article and the need to produce the molded article economically. Although each of these methods bear some resemblance to one another, each has its own design and operational requirements. Factors to consider in choosing a molding technique for making an article include, for example, article design features, mold design, molding procedures, press selection and operation, and postmolding tools and fixtures.

Compression molding generally employs a vertical, hydraulically operated press which has two platens, one fixed and one moving. The mold halves are fastened to the platens. The premeasured molding compound charge is placed into the heated mold cavity, either manually or automatically. Automatic charging involves use of process controls and allows wider application of the molding method. The mold is then closed with application of the appropriate pressure and temperature. At the end of the molding cycle, the mold is opened hydraulically and the molded part is removed.

Compression molding mold design consists fundamentally of a cavity with a plunger. Depending upon final part design, the mold will have various slides, ejection pins, and/or moving plates to aid in mold operation and extraction of the molded article. The mold flash gap and dimensional tolerances can be adjusted to accommodate compound characteristics and part requirements.

Transfer molding is similar to compression molding, except for the method in which the charge is introduced into the mold cavity. This technique is typically applied to multiple cavity molds. In this method, the charge is manually or automatically introduced into a cylinder connected to the mold cavities via a system of runners. A screw can be employed to introduce the material into the transfer cylinder. A secondary hydraulic unit is used to power a plunger which forces the molding compound through the runners and into the mold cavities of the closed mold. A vertical, hydraulic press then applies the needed pressure at the appropriate temperature to compression mold the intended part. Transfer mold design is somewhat more complicated than that of compression molds, due to the presence of the transfer cylinder and runners and due to internal mold flow considerations, but general attributes are similar. Use of a shuttle press can be employed to allow encapsulation of molded-in inserts.

In general, co-injection molding is related to transfer molding, except that the hydraulic press is generally horizontally oriented, and the molding compound is screw injected into the closed mold cavities via a sprue bushing and a system of gates and runners. Pressure is then applied at the appropriate temperature to solidify the part. The mold is opened for part ejection and removal, the mold is closed, and the next charge is injected by the screw. This injection molding technique has a significant advantage in cycle time versus the other techniques listed above. As such, it finds widespread use in multicavity molding applications. Injection mold designs are yet more complex and require special attention to internal mold flow of the molding compound. In an extended application of injection molding, a vertically oriented shuttle press can be employed to allow encapsulation of molded-in inserts.

In summary, the compression molding technique is primarily a semi-batch method which typically exhibits the least part shrinkage and the highest part density, but has the longest cycle time, is limited in ability to produce molded-in inserts, is limited in complexity of mold design, and requires the most work to finish the molded product (flash removal). Transfer molding and injection molding are semiautomatic and automatic methods, respectively, with shorter method cycle times, excellent operability in producing molded-in inserts, and less work in finishing molded parts. Both techniques typically exhibit a lower part density and increased shrinkage versus compression molding.

Sheeting or film of the instant invention may be prepared by any of the co-extrusion methods well known to those skilled in the art. For example, a sheet of each of components (A) and (B) may be extruded and then placed together while in a heat-softened condition in the coextrusion die or after the outlet of the die, to form a pre-formed article. If chemical crosslinkers are present, crosslinking will occur. If not, the sheet can be subjected to radiation crosslinking. Alternatively, a composite stream of molten polymer may be formed, having a layer of (A) on one side and a layer of (B) on the other side thereof This composite stream is then fed to an extrusion die wherein the composite stream is laterally expanded or reshaped into the composite sheeting or film. In order to produce a co-extruded composite product having the desired layer arrangement and thickness, the feed rates in each of the feed lines of the co-extrusion unit may be controlled, relative to each other, as would be obvious to those skilled in the art.

Once the multilayer article is pre-formed, crosslinking needs to be performed in order to cause (A) and (B) to bond together. Without this crosslinking, the (A) and (B) layers would be easy to separate. By intercrosslinking, (A) and (B) cannot be separated or can only be separated with great difficulty and damage to the article. The instant invention thus has a high peel strength after crosslinking versus the very low peel strength before crosslinking.

Crosslinking can be effected by radiation. This radiation comprises X-rays, gamma rays, ultraviolet light, visible light or electron beam, also known as e-beam. "Ultra-violet" or "UV" means radiation at a wavelength or a plurality of wavelengths in the range of from 170 to 400 nm. "Ionizing radiation" means high energy radiation capable of generating ions and includes electron beam radiation, gamma rays and x-rays. The term "e-beam" means ionizing radiation of an electron beam generated by Van de Graaff generator, electron-accelerator or x-ray.

The radiation crosslinking can occur at elevated temperature such as when both (A) and (B) are placed together at above the melting point of either component or at room temperature or at any temperature in between.

The timing for crosslinking by radiation is a matter of opportunity. It is possible to immediately crosslink once (A) and (B) are adjoined while the multilayer article is still at an elevated temperature. In this scenario, the final product is thus formed. An alternative scenario would be to place (A) and (B) together to form a non-crosslinked article at an elevated temperature, permit the non-crosslinked article to cool, and then cause crosslinking to occur at a later time when the non-crosslinked article is at or near room temperature. Radiation doses are referred to herein in terms of the radiation unit, "rad", with one million rads or a megarad being designated as "Mrad". The degree of molecular crosslinking depends on the radiation dose and normally the higher the dose, the greater the crosslinking.

"Radiation" as used herein generally means ionizing radiation such as X-rays, gamma rays, and high energy electrons which directly induce molecular crosslinking. (However, when used in conjunction with crosslinking agents dispersed within a material, both heat and light can be considered forms of radiant energy which induce crosslinking.) Electrons are the preferred form of radiant energy and are preferably produced by commercially available accelerators in the range of 0.1 to 2.0 MeV.

The preferred method of crosslinking is by irradiation with ionizing radiation. Accordingly, in the preferred method the multilayer article is irradiated by passing it through an electron beam emanating from an electron accelerator. In a typical accelerator, the beam will be scanned across the width of the multilayer article, and the multilayer article will be passed and repassed through the beam until the desired radiation dosage is obtained. The electrons will generally be in the energy range of 0.1 to 2.0 MeV., and it has been found that for the present invention the preferred dosage level is in the range of 1.0 to 12.0 megarad (Mrad). Of course, any ionizing radiation which will induce any crosslinking between the long chain molecules of the olefin polymers is suitable. The dosage required to sufficiently strengthen the multilayer structure will vary according to the molecule weight, density, and constituents of the cross-linkable material and will be as low as 1.0 Mrad for some structures such as polyethylene. On the other hand, at dosage levels greater than 12 Mrad some copolymers become cross-linked to such an extent that they become stiff and difficult to handle. Thus, for most structures it has been found that the optimum dosage level range is between 4 and 8 Mrad. After the irradiation stage, a multilayer article is formed.

With some forms of radiation, it is advantageous to utilize a photoinitiator or sensibilizer composition. Accordingly, component (B) may further include a photoinitiator compound. Such compounds are blended with (B) to provide a substantially uniform composition. When ultra-violet radiation is contemplated as the form of irradiation, (B) preferably should contain the photoinitiator in order to increase the crosslink efficiency, i.e., degree of crosslink per unit dose of radiation, and when e-beam radiation is contemplated as the form of irradiation, (B) may, optionally, include a photoinitiator. Although e-beam radiation is not normally associated with photoinitiators, as crosslinking readily occurs in the absence of such compounds, it has been reported that when (B) is employed which contains such photoinitiator compounds, crosslinking efficiency increases, and therefore one can attain a higher degree of crosslinking, utilize a lower dose of electron beam radiation or a combination thereof.

Suitable photoinitiators include, but are not limited to, benzophenone, ortho- and para-methoxybenzophenone, dimethylbenzophenone, dimethoxybenzophenone, diphenoxybenzophenone, acetophenone, o-methoxy-acetophenone, acenaphthenequinone, methyl ethyl ketone, valerophenone, hexanophenone, alpha-phenylbutyrophenone, p-morpholinopropiophenone, dibenzosuberone, 4-morpholinobenzophonone, benzoin, benzoin methyl ether, 3-o-morpholinodeoxybenzoin, p-diacetylbenzene benzene, 4-aminobenzophenone, 4'-methoxyacetophenone, alpha-tetralone, 9-acetyl-phenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydrophyranyl ether, 4,4'-bis (dimethylamino)-benzophenone, 1'-acetonaphthone, 2'acetonaphthone, acetonaphthone and 2,3-butanedione, benz[a]anthracene-7,12-dione, 2,2-dimethoxy-2-phenylaceto-phenone, alpha, alpha-diethoxy-acetophenone, alpha, alpha-dibutoxy-acetophenone, anthraquinone, isopropylthioxanthone and the like. Polymeric initiators include poly(ethylene/carbon monoxide), oligo[2-hydroxy-2-methyl-1-[4-(1-methylvinyl)-phenyl]propanone], polymethylvinyl ketone, and polyvinylaryl ketones. Use of a photoinitiator is preferable in combination with UV irradiation because it generally provides faster and more efficient crosslinking.

Preferred photoinitiators that are commercially available include benzophenone, anthrone, xanthone, and others, the Irgacure™ series of photoinitiators from Ciba-Geigy Corp., including 2,2-dimethoxy-2-phenylacetophenone (Irgacure™ 651); 1-hydroxycyclohexylphenyl ketone (Irgacure™ 184) and 2-methyl-1-[4-(methylthio) phenyl]-2-morpholino propan-1-one (Irgacure™ 907). The most preferred photoinitiators will have low migration from the formulated resin, as well as a low vapor pressure at extrusion temperatures and sufficient solubility in the polymer or polymer blends to yield good crosslinking efficiency. The vapor pressure and solubility, or polymer compatibility, of many familiar photoinitiators can be easily improved if the photoinitiator is derivatized. The derivatized photoinitiators include, for example, higher molecular weight derivatives of benzophenone, such as 4-phenylbenzophenone, 4-allyloxybenzophenone, allyloxybenzophenone, 4-dodecyloxybenzophenone and the like. The photoinitiator can be covalently bonded to (B). The most preferred photoinitiators will, therefore, be substantially non-migratory from the packaging structure.

The photoinitiator is added in a concentration of from 0 to about 3 weight percent, preferably 0.1 to 2 weight percent of (B).

Crosslinking can also be performed by the use of a chemical crosslinking agent comprising peroxides, amines and silanes.

With chemical crosslinking, (B) is prepared for use by forming a substantially uniform or homogenous blend of (B) with a crosslinking agent. Each of the chemical crosslinking agents are described in more detail below. Typically, the blend of (B) and the crosslinking agent are prepared by dry blending solid state forms of (B) and the crosslinking agent, i.e., in powder form. However, the blend may be prepared using any of the techniques known in the art for preparing a simple blend, such as preparing a blend from the components in liquid form, sorbed in inert powdered support and by preparing coated pellets, and the like.

Thermally activatable crosslinking agents useful in the invention include any of the free radical generating chemicals known in the art. Such chemicals when exposed to heat decompose to form at least one, and typically two or more free radicals to affect crosslinking. Any of the crosslinking agents known in the art may be used in accordance with the present invention, but preferably the crosslinking agent is an organic crosslinking agent comprising organic peroxides, amines and silanes.

Exemplary organic peroxides which can be used in this invention include, but are not limited to, 2,7-dimethyl-2,7-di(t-butylperoxy)octadiyne-3,5; 2,7-dimethyl-di(peroxy ethyl carbonate)octadiyne-3,5; 3,6-dimethyl-3,6-di(peroxy ethyl carbonate)octyne-4; 3,6-dimethyl-3,6-(t-butylperoxy) octyne-4; 2,5-dimethyl-2,5-di(peroxybenzoate) hexyne-3; 2,5-dimethyl-2,5-di(peroxy-n-propyl carbonate)hexyne-3; 2,5-dimethyl-2,5-di(peroxy isobutyl carbonate)hexyne-3; 2,5-dimethyl-2,5-di(peroxy ethyl carbonate)hexyne-3; 2,5-dimethyl-2,5-di(alpha-cumyl peroxy)hexyne-3; 2,5-dimethyl 2,5-di(peroxy beta-chloroethyl carbonate) hexyne-3; and 2,5-dimethyl-2,5-di(t-butylperoxy) hexyne-3. The currently preferred crosslinking agent is 2,5-dimethyl-2,5-di(t-butyl peroxy) hexyne-3, available from Elf Atochem under the trade designation Lupersol 130. Another exemplary crosslinking agent is dicumyl peroxide, available from Elf Atochem as Luperox 500R. Preferably, the crosslinking agent is present in the polymer in an amount between 0.1 to 5%, preferably 0.5 to 2%, by weight based on the weight of (B).

Suitable silanes for silane crosslinking include those of the general formula

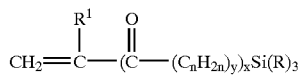

in which $R^1$ is a hydrogen atom or methyl group; x and y are 0 or 1 with the proviso that when x is 1, y is 1; n is an integer from 1 to 12 inclusive, preferably 1 to 4, and each R independently is a hydrolyzable organic group such as an alkoxy group having from 1 to 12 carbon atoms (e.g. methoxy, ethoxy, butoxy), aryloxy group (e.g. phenoxy), aralkoxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl. Such silanes may be grafted to a suitable polyolefins by the use of a suitable quantity of organic peroxide, either before or during a shaping or molding operation. Additional ingredients such as heat and light stabilizers, pigments, etc., also may be included in the formulation. In any case, the crosslinking reaction takes place following the shaping or molding step by reaction between the grafted silane groups and water, the water permeating into the bulk polymer from the atmosphere or from a water bath or "sauna". The phase during which the crosslinks are created is commonly referred to as the "cure phase" and is commonly referred to as "curing".

Any silane that will effectively graft to and crosslink (B) can be used in the practice of this invention. Suitable silanes include unsaturated silanes that comprise an ethylenically unsaturated hydrocarbyl group, such as a vinyl, allyl, isopropenyl, butenyl, cyclohexenyl or gamma-(meth) acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, gamma.-(meth)acryloxy propyl trimethoxy silane and mixtures of these silanes are the preferred silane crosslinkers for use in this invention. If a filler is present, then preferably the crosslinker includes vinyl triethoxy silane.

The amount of silane crosslinker used in the practice of this invention can vary widely depending upon the nature of the thermoplastic polymer, the silane, the processing conditions, the grafting efficiency, the ultimate application, and similar factors, but typically at least 0.5, preferably at least 0.7, parts per hundred resin (phr) is used. Considerations of convenience and economy are usually the two principal limitations on the maximum amount of silane crosslinker used in the practice of this invention, and typically the maximum amount of silane crosslinker does not exceed 5, preferably it does not exceed 2, phr.

The silane crosslinker is grafted to (B) by any conventional method, typically in the presence of a free radical initiator e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is azobisisobutyl nitrite. The amount of initiator can vary, but it is typically present in an amount of at least 0.04, preferably at least 0.06, phr. Typically, the initiator does not exceed 0.15, preferably it does not exceed about 0.10, phr. The ratio of silane crosslinker to initiator also can vary widely, but the typical crosslinker:initiator ratio is between 10:1 to 30:1, preferably between 18:1 and 24:1.

While any conventional method can be used to graft the silane crosslinker to (B), one preferred method is blending the two with the initiator in the first stage of a reactor extruder, such as a Buss kneader. The grafting conditions can vary, but the melt temperatures are typically between 160 and 260° C., preferably between 190 and 230° C., depending upon the residence time and the half life of the initiator.

Cure is promoted with a crosslinking catalyst, and any catalyst that will provide this function can be used in this invention. These catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

The amine crosslinking agents which can be used herein include the monoalkyl, dually and trialkyl monoamines, wherein the alkyl group contains from about 2 to about 14 carbon atoms, the trialkylene diamines of the formula $N(R^2)_3N$, the dialkylene diamines of the formula $HN(R^2)_2NH$, the alkylene diamines, $H_2NR^2NH_2$, the dialkylene triamines, $H_2NR^2NHR^2NH_2$, and aliphatic amines having a cyclic chain of from four to six carbon atoms. The alkylene group $R^2$ in the above formulae preferably contains from about 2 to about 14 carbon atoms. The cyclic amines can have heteroatoms such as oxygen contained therein, for example, as in the N-alkyl morpholines. Other cyclic amines which can be used include pyridine and N,N-dialkyl cyclohexylamine. The above amines are relatively non-volatile and will not be driven off by any generated heat. Examples of suitable amines are triethylamine; di-n-propylamine; tri-n-propylamine; n-butulamine, cyclohexylamine; triethylenediamine, ethylenediamine; propylenediamine; hexamethylenediamine; N,N-diethyl cyclohexylamine and pyridine. If desired, the amines can be dissolved in a suitable solvent. For example, triethylenediamine, can be dissolved in polyhydroxy tertiary amines. From about 0.5% to about 10% of the amine should be used based on the weight of (B). Aromatic amines should not be used, since they are toxic and often produce discoloration of the crosslinked product.

Once the chemical crosslinking agent is blended into (B), (A) and (B) are placed in contact with each other and crosslinked such that a multilayer article is formed. Chemical crosslinking is a reaction wherein the crosslinking agent decomposes and generates free radicals which causes crosslinking of (A) and (B) forming the multilayer article. The decomposition of the crosslinking agent is a time-dependent reaction in that the higher the temperature, the faster the crosslinking agent decomposes and generates free radicals. A "half-life" time of a crosslinking agent is a time needed for decomposition of one-half of the crosslinking agent. For dicumyl peroxide, the half-life time is about 100 hours at 100° C., 10 hours at 120° C., 1 hour at 138° C., and 30 seconds at 182° C. Other crosslinking agents behave similarly.

One form of blending is dry blending wherein (B) and the chemical crosslinking agent are simultaneously supplied to an extruder. The (B) and the crosslinking agent can be premixed or finally mixed within the extruder to provide the polymer-crosslinking agent blend. Separate supply lines for (B) and for the crosslinking agent can be provided such that mixing of (B) and the crosslinking agent occurs within the screw extruder. Alternatively, the (B) and crosslinking agent can be directed to a mixing apparatus as known in the art for preparing a simple blend and the blend then directed to the extruder for further mixing and heating.

In another embodiment that utilizes a crosslinking agent, the crosslinking agent may be added to (A) instead of (B), when (A) is a crosslinkable polymer. Further, when (A) is a crosslinkable polymer, the crosslinking agent may be added to both (A) and (B).

One method stated above for contacting (A) and (B) is co-extrusion. The following operation is a discussion of the co-extrusion method wherein crosslinking is effected by radiation.

To illustrate crosslinking by radiation, a film is prepared by the extrusion process. In the extrusion process, (A) and (B) can be separately melted and separately supplied or jointly melted and supplied to a co-extrusion feed block and die head wherein a film of (A) and (B) is generated. Preferably, the extrusion die is configured to provide a substantially uniform flow of polymer evenly distributed across the die. A currently preferred die employs a "coat hanger" type configuration, as known in the art. An exemplary linear coat hanger die head is commercially available from Extrusion Dies, Inc. and Cloereu Die Corp., although as the skilled artisan will appreciate, other die head types and configurations can be used which provide for the substantially uniform flow of polymer evenly distributed across the die head. A continuous sheet is formed from the molten polyethylene using the extruder and linear die head and take-off equipment. It should be noted that it is necessary to carefully control the temperature at which the polymer is supplied to the die and extruded under pressure through the die. This temperature should be maintained below the decomposition temperature of the crosslinking agent, yet high enough, i.e., at least at the melting temperature of the polymer, so that composition can flow to form a material web. Preferably the polymer temperature is maintained within a range of about 5° C. above and below a set average as it is supplied to the die and within a range of between about 5° C. above and below a set average as it passes through the die head. Molten film of varying thickness can be obtained either by adjusting the gap of the die head or by adjusting the speed of the take up roll, which causes the film to drawdown. A combination of these adjustments is also envisioned.

Once the film is formed, radiation crosslinking can immediately be carried out and the film can be rolled. Alternatively, the film can be rolled in an uncrosslinked state, unrolled at a later time and then subjected to radiation crosslinking.

In the table below, data is shown for a three-layer film of (A)/(B)/(A) which is cast-coextruded from different materials. A one-inch Killoin extruder for (B) and a ¾-inch Brabender extruder for (A) with an (A)/(B)/(A) feedblock and 8-inch wide die are used for co-extrusion. The layer thickness ratio is about 15%:70%:15%. Extrusion temperatures are listed in Table I.

TABLE I

| | | Temperature (° C.) by zones of extruders | | | | | | | | | |
|---|---|---|---|---|---|---|---|---|---|---|---|
| | | Brabender extruder zones (polymer A) | | | | Killion extruder zones (polymer B) | | | | | |
| Example Number | Skin/Core/Skin Layers A/B/A | 1 | 2 | 3 | Adapter | 1 | 2 | 3 | Adapter | Feed-block | Die |
| 1 | FEP/LDPE/FEP | 260 | 290 | 300 | 300 | 170 | 250 | 250 | 250 | 290 | 270 |
| 2 | FEP/EPDM/FEP | 260 | 290 | 300 | 300 | 170 | 250 | 250 | 250 | 290 | 270 |
| 3 | ECTFE/LDPE/ECTFE | 245 | 280 | 270 | 265 | 160 | 210 | 215 | 230 | 250 | 240 |
| 4 | ECTFE/EPDM/ECTFE | 245 | 280 | 270 | 265 | 170 | 290 | 300 | 250 | 250 | 240 |
| 5 | THV/LDPE/THV | 220 | 270 | 260 | 260 | 160 | 230 | 230 | 260 | 280 | 230 |
| 6 | THV/EPDM/THV | 220 | 270 | 260 | 260 | 160 | 240 | 285 | 280 | 280 | 220 |
| 7 | Copolyester/LDPE/Copolyester | 190 | 255 | 245 | 245 | 170 | 230 | 240 | 245 | 250 | 260 |
| 8 | Copolyester/EPDM/Copolyester | 190 | 255 | 245 | 245 | 170 | 230 | 240 | 245 | 250 | 260 |

General purpose LDPE grade NA353000 manufactured by Equistar is used as a core layer in odd-number examples. In the even-number examples, the core layer is made of EPDM Nordel 4920 manufactured by DuPont Dow Elastomers L.L.C. Three fluoropolymers and one copolyester are used as skin layers of the multilayer film:

FEP NP-12x supplied by Daikin
ECTFE Halar 300 LC supplied by Ausimont
THV 500 G supplied by Dyneon
Copolyester thermoplastic elastomer Arnitel EM 740 supplied by DSM Samples, 6×10 inch, cut from the extruded films are subjected to UV or to e-beam treatment for intercrosslinking of polymer layers. The UV treatment was performed using an H-plus type UV bulb (manufactured by Fusion-UV Systems, Inc.) with 300 W/in power at 50'/min conveyor speed. In order to increase the UV exposure, each side of the samples is subjected to UV light 32 times. The e-beam treatment is performed with one pass of the sample through the treater at 175 kV accelerating voltage. The dosage of the e-beam radiation is 12 Mrad for all treated samples. The interlayer adhesion is evaluated by measuring force of layer separation in T-peel test. Strips, 1"-wide, are cut from the film samples; two pieces of masking tape are applied to both sides of the strip and pulled apart starting delamination of one skin layer. Calibrated weights are used in order to determine static peel force; the smallest weight is 2.5 g. The interlayer adhesion data for untreated, UV-treated or e-beam treated samples are listed in the Table II.

TABLE II

| | | Static T-peel force g/in between layers of multilayer film | | |
|---|---|---|---|---|
| Example # | Skin/Core/Skin Layers | Untreated | UV – 32 times 300 W/in-50'/min | e-beam 12 Mrad |
| 1 | FEP/LDPE/FEP | <2.5 grams | 4 grams | 42 grams |
| 2 | FEP/EPDM/FEP | <2.5 | >200, breaks | 70 |
| 3 | ECTFE/LDPE/ECTFE | 8 | 150 | 40 |
| 4 | ECTFE/EPDM/ECTFE | 40 | >500 | 80 |
| 5 | THV/LDPE/THV | <2.5 | 4 | 75 |
| 6 | THV/EPDM/THV | 4 | 15 | Breaks |
| 7 | Arnitel/LDPE/Arnitel | 12 | 7 | 22 |
| 8 | Arnitel/EPDM/Arnitel | 180 | >500 | 220 |

As it is seen from the table, most of the untreated film samples have poor interlayer adhesion. At the same time, in Examples 4 and 8, there is a considerable interaction between coextruded layers even before the treatment. The peel force depends on interlayer adhesion and on mechanical properties of the substrate materials because T-peel is accompanied by bending and stretching of the film samples. Therefore, fair comparison can be made only for the same pairs of materials, treated or untreated. Increase of the peel force for about an order of magnitude or more indicates a significant improvement of interlayer adhesion. In some samples delamination is impossible without breaking the skin layer (such as e-beam treated film in Example 6), where the adhesive force is higher than the cohesive force.

EPDM containing unsaturated chemical bonds can be crosslinked by UV, while LDPE is not UV-crosslinkable.

Accordingly, in examples 1, 5 and 7 where LDPE is used as a core layer, UV-treatment does not improve interlayer adhesion. All examples with EPDM show increase of peel force after UV-treatment. Both EPDM and LDPE can be crosslinked by e-beam, and therefore all e-beam-treated samples showed higher interlayer adhesion.

Two cases in Table II differ somewhat from the other examples. In example 3, a strong interaction between LDPE and ECTFE was unexpectedly achieved by UV-treatment. Apparently, chemical bonds in ECTFE were activated by UV light. In example 8, a significant interaction between coextruded layers was observed even before any treatment. Nevertheless, UV-treatment definitely improved the interlayer adhesion in the Example 8.

As it can be seen from the examples, adhesion improvement varied from slight to dramatic. Out of all polymers listed here, FEP is the most difficult one for bonding to any other polymers. The combination FEP/EPDM is chosen as preferable because this pair shows the most profound increase of mutual adhesion achieved by intercrosslinking.

While the invention has been explained in relation to its preferred embodiments, it is to be understood that various modifications thereof will become apparent to those skilled in the art upon reading the present description. Therefore, it is to be understood that the invention disclosed herein is intended to cover such modifications as fall within the scope of the appended claims.

What is claimed is:

1. An intercrosslinked multilayer polymeric article, comprising;
   (A) at least one polymer layer, comprising a fluoropolymer selected from the group consisting of FEP, PEA, ETFE, ECTFE, PCTFE, PVDE, THV, and blends and/or alloys thereof, in contact with
   (B) at least one crosslinkable polymer layer consisting essentially of EPDM, wherein (A) and (B) are incompatible with each other, and wherein (A) and (B) are secured together by intercrosslinking.

2. The article of claim 1 wherein the polymer layer (A) is a crosslinkable polymer.

3. The article of claim 1 wherein the fluoropolymer is FEP.

4. The article of claim 1 where the multilayer article is formed by co-extrusion, co-lamination or extrusion-lamination.

5. The article of claim 4 wherein the co-extrusion provides a film or sheet.

6. The article of claim 4 wherein the co-extrusion provides tubing or profile.

7. The article of claim 1 wherein the article is formed by co-molding.

8. The article of claim 7 wherein the co-molding comprises injection molding, co-injection molding, multi-material molding, multi-shot molding, transfer molding, compression molding or blow molding.

9. The article of claim 7 wherein co-molding provides a container.

10. The article of claim 1 wherein the intercrosslinking of the multilayer article is by the use of X-rays.

11. The article of claim 1 wherein the intercrosslinking of the multilayer article is by the use of gamma rays.

12. The article of claim 1 wherein the intercrosslinking of the multilayer article is by the use of ultraviolet light or visible light.

13. The article of claim 1 wherein the intercrosslinking of the multilayer article is by the use of an electron beam.

14. The article of claim 1 wherein the intercrosslinking of the multilayer article is by the use of a chemical crosslinking agent comprising peroxides, amines or silanes.

15. The article of claim 14 wherein the chemical crosslinking agent is an organic peroxide.

16. The article of claim 1 wherein one layer each of (A) and (B) is present.

17. The article of claim 1 wherein a layer of (A) is adjoined to each side of one layer of (B).

* * * * *

UNITED STATES PATENT AND TRADEMARK OFFICE
CERTIFICATE OF CORRECTION

PATENT NO. : 6,652,943 B2
DATED : November 25, 2003
INVENTOR(S) : A. Tukachinsky, M. L. Friedman and P. W. Ortiz It is certified that error appears in the above-identified patent and that said Letters Patent is hereby corrected as shown below:

Column 15,
Line 35, delete "PEA" and substitute -- PFA -- therefor.

Signed and Sealed this

Sixth Day of January, 2004

JAMES E. ROGAN
*Director of the United States Patent and Trademark Office*